United States Patent [19]

Lutz

[11] Patent Number: 4,816,514

[45] Date of Patent: Mar. 28, 1989

[54] POLYMER BLENDS OF POLYOLEFINS AND ALTERNATING COPOLYMERS OF CARBON MONOXIDE AND OTHER MONOMERS

[75] Inventor: Robert G. Lutz, Santa Rosa, Calif.

[73] Assignee: Shell Oil Company, Houston, Tex.

[21] Appl. No.: 203,976

[22] Filed: Jun. 8, 1988

[51] Int. Cl.[4] ................................................ C08F 8/00
[52] U.S. Cl. .................................... 525/55; 525/153; 525/539; 525/130; 525/189; 528/392
[58] Field of Search ................ 525/55, 153, 539, 130, 525/189; 528/392

[56] References Cited

U.S. PATENT DOCUMENTS

| | | | |
|---|---|---|---|
| 2,495,285 | 1/1950 | Hoehn | 260/28.5 |
| 2,495,286 | 1/1950 | Brubaker | 260/63 |
| 3,248,359 | 4/1966 | Maloney | 260/41 |
| 3,694,412 | 9/1972 | Nozaki | 260/63 |
| 4,642,326 | 2/1987 | Yasumura et al. | 525/153 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 8/1987 | European Pat. Off. . |
| 1055691 | 1/1964 | United Kingdom . |
| 1081304 | 8/1965 | United Kingdom . |

Primary Examiner—Harold D. Anderson
Assistant Examiner—T. Mason

[57] ABSTRACT

Blends of a linear alternating polymer of carbon monoxide and at least one ethylenically unsaturated hydrocarbon with a poly(α-olefin) exhibit improved processability.

8 Claims, No Drawings

POLYMER BLENDS OF POLYOLEFINS AND ALTERNATING COPOLYMERS OF CARBON MONOXIDE AND OTHER MONOMERS

FIELD OF THE INVENTION

This invention relates to an improved polymer blend comprising predominantly a linear alternating polymer of carbon monoxide and at least one ethylenically unsaturated hydrocarbon. More particularly the invention relates to blends of the linear alternating polymer with a polyolefin.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar materials of higher carbon monoxide content in the presence of alkylphosphine complexes of palladium salts as catalyst. Nozaki extended this process to produce linear alternating polymers in the presence of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon has become of greater interest in part because of the availability of the polymers. These polymers, often referred to as polyketones or polyketone polymers have been shown to be of the repeating formula —CO—(A)— wherein A is the moiety of an ethylenically unsaturated hydrocarbon polymerized through the ethylenic saturation. For example, when the ethylenically unsaturated hydrocarbon is ethylene the polymer will be presented by the repeating formula —CO—($CH_2$—$CH_2$)—. The general process for the more recent production of such polymers is illustrated by a number of published European Patent Applications including 121,965 and 181,014. The process typically involves a catalyst composition formed from a compound of palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for food and drink and internal and external parts for the automotive industry which are produced by processing the polyketone polymer according to known methods. For some particular applications it has been found desirable to provide a polymeric composition of properties which are somewhat different from those of the polyketone polymers. It would be an advantage to retain the more desirable properties of the polyketone polymer and yet improve other properties. Such advantages are often obtained through the provision of a polymer blend.

SUMMARY OF THE INVENTION

The present invention contemplates the provision of blends of a linear alternating polymer of carbon monoxide and at least one ethylenically unsaturated hydrocarbon and certain other polymeric material. More particularly, according to the invention, there are provided blends of the linear alternating polymer with a polyolefin.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons which are useful as precursors of the polyketone polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula

wherein B is the moiety of the second hydrocarbon polymerized through the ethylenic unsaturation and the ratio of y:x is no more than about 0.5. The units of —CO—($CH_2$—$CH_2$—) and —CO—(B)— are found randomly throughout the polymer chain. In the modification of the invention where copolymer of carbon monoxide and ethylene is employed as a blend component there will be no second hydrocarbon in the polymer chain and the polymer is represented by the above formula wherein y=0. If y is other than 0, i.e., terpolymers are employed, ratios of y:x from about 0.01 to about 0.1 are preferred. The end groups or "caps" of the polymer chain will depend on what materials were present during the preparation of the polyketone and whether and how the polymer was purified. The precise properties of the polymer will not depend to any considerable extent upon the particular end groups so that the polymer is fairly represented by the above formula for the polymer chain.

Of particular interest are those polyketones of a number average molecular weight from about 1,000 to about 200,000, preferably those of molecular weight from about 20,000 to about 90,000 as determined by gel permeation chromatography. The physical properties of the polyketone polymers will depend in part on the molecular weight of the polymer, whether the polymer is a copolymer or a terpolymer and the proportion of the second hydrocarbon present in the case of a terpolymer. Typical melting points for such polymers are from about 175° C. to about 300° C., more typically from about 210° C. to about 270° C. The polyketone polymers have a limiting viscosity number (LVN) as measured in m-cresol at 60° C. in a standard capillary viscosity measuring device of from about 0.5 to about 10, preferably from about 0.8 to about 0.4.

A method of producing the polyketone polymers which is now becoming conventional is to contact the carbon monoxide and ethylenically unsaturated hydrocarbon(s) in the presence of a palladium compound, the anion of a non-hydrohalogenic acid having a pKa below about 6 and a bidentate phosphorus ligand. The scope of the process for polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,3-bis(diphenylphosphino)propane or 1,3-bis[di(2-methoxyphenyl)phosphino]propane. Such a process for polyketone production is illustrated by copending U.S. application Ser. No. 930,468, filed Nov. 14, 1986.

Polymerization is conducted in a gas phase in the substantial absence of diluent or in a liquid phase in the presence of an inert diluent such as an alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer product is recovered as by decantation or filtration. The polymer product may contain residues of the catalyst which are removed, if desired, by treatment with a solvent or a complexing agent which is selective for the residues.

The minor component of the blends of the invention is a polyolefin polymer preferably a crystallized or crystallizable poly($\alpha$-olefin) wherein the $\alpha$-olefin has up to 6 carbon atoms. Homopolymers of such $\alpha$-olefins are useful as well as copolymers and on some occasions it has been found useful to optionally employ long-chain $\alpha$-olefins of up to 20 carbon atoms in minor proportions, less than 35% by weight, in the poly($\alpha$-olefin) to be used as a blend component. Illustrative $\alpha$-olefins which are suitable monomers for the production of the poly($\alpha$-olefin) include ethylene, propylene, 1-butene, isobutylene, 1-pentene and 4-methyl-1-pentene. In general, polymers and copolymers of these $\alpha$-olefins are conventional and well known in the art as are methods for their production. Poly($\alpha$-olefin) and methods of production are illustrated in Kirk-Othmer, Encyclopedia of Chemical Technology, Vol. 14, pages 217–335 (1969) and Supplement Volume, pages 789–907 (Second Edition, 1971). The average molecular weight of a poly($\alpha$-olefin) useful as a blend component will be above about 10,000 and preferably above above 50,000. The apparent melting point of the polyolefin polymer should be above about 100° C. and preferably be between about 100° C. and about 250° C.

Although polyethylene is usefully employed in the blends of the invention, the preferred poly($\alpha$-olefin) is a polymer of $\alpha$-olefin wherein the at least predominant monomer has at least 3 carbon atoms. Such poly($\alpha$-olefin) will necessarily have branching on the polymer chain. Depending upon the reaction conditions under which these polyolefins were produced and upon the specific catalyst employed, the poly($\alpha$-olefin) may have segments of polymer chain which are atactic, syndiotactic or isotactic or mixtures thereof as in a stereo-block configuration. The isotactic poly($\alpha$-olefin) form is generally preferred as a component of the blends of the invention Poly($\alpha$-olefin) is generally produced by employing a catalyst prepared from titanium trichloride or tetrachloride and an alkyl aluminum compound such as triethylaluminum or diethyl aluminum chloride.

Preferred poly($\alpha$-olefin) polymers are polyethylene, polypropylene, poly(1-butene) and poly(4-methyl-1-pentene) of which poly(4-methyl-1-pentene) is particularly preferred.

The poly(4-methyl-1-pentene) has an apparent crystalline melting point of 240°–250° C. and a relative density between about 0.8 and 0.85. This material is commercially available, and usefully provided, as a copolymer of 4-methyl-1-pentene with from about 0.5% to about 30% by weight, based on total copolymer, of a linear $\alpha$-olefin of from 4 to 18 carbon atoms inclusive. It is marketed by Mitsui Chemical Company as TPX ® Resin.

The blends of the invention comprise a major proportion of the polyketone polymer and a minor proportion of the polyolefin polymer. The precise percentage of the polyolefin polymer to be employed in the blend is not critical and amounts of polyolefin polymer from about 0.5% by weight to about 35% by weight, based on total blend, are satisfactory. Amounts of polyolefin polymer from about 1% by weight to about 20% by weight on the same basis are preferred.

The method of producing the blend of the polyketone polymer and the polyolefin polymer is not material as long as a relatively uniform distribution of the polyolefin polymer throughout the polyketone is obtained. The polyketone/polyolefin polymer blend is a non-miscible blend with the polyolefin polymer existing as a discrete phase in the polyketone matrix have a phase size of from about 5 microns to about 15 microns, more typically on the order of from about 9 microns to about 13 microns. The blend will not therefore be homogeneous but satisfactory blends are obtained when the distribution of the polyolefin phase throughout the polyketone polymer matrix is substantially uniform. The methods of blending the components are those methods which are conventional for the blending of non-miscible polymeric materials. In one modification the components are blended in a corotating twin screw extruder. In an alternate modification the components are blended in a mixing device which exhibits high shear.

The blends of the invention may also include conventional additives such as antioxidants, stabilizers, mold release agents, colorants, fire resistant materials and other substances which are added to increase the processability of the polymer components or modify the properties of the resulting blend. Such additives are added by conventional methods prior to, together with or subsequent to the blending of the polyketone polymer or polyolefin polymer.

The blends of the invention are characterized by improved processability. The blends are processed by the usual techniques such as extrusion and injection molding into sheets, films, fibers and shaped articles. Illustrative of applications for the blends of the invention are the production of external as well as internal parts for automotive application and the formation of structural materials for utilization in the construction industry.

The invention is further illustrated by the following Illustrative Embodiments which should not be construed as limiting the invention.

ILLUSTRATIVE EMBODIMENT I

A linear alternating polymer of carbon monoxide, ethylene and propylene was produced in the presence of a catalyst composition formed from palladium acetate, the anion of trifluoroacetic acid and 1,3-bis(diphenylphosphino)propane. The melting point of the polymer was 225° C. and the polymer had a limiting viscosity number (LVN) of 1.72 when measured in m-cresol at 60° C.

ILLUSTRATIVE EMBODIMENT II

A blend of the polyketone polymer of Illustrative Embodiment I and poly(4-methyl-1-pentene) polymer was produced. The poly(4-methyl-1-pentene) was obtained from Mitsui and is a homopolymer of 4-methyl-1-pentene with processing aids added. The polyketone polymer, 10% by volume of the poly(4-methyl-1-pentene) and 0.2% by weight based on total blend of Irganox 1076, a conventional hindered phenolic antioxidant to provide background stabilization, were passed through a twin screw Baker Perkins extruder. The extruder temperature was 240° C. operating with undried feed under a nitrogen blanket. The extruder was operated at maximum RPM to produce a residence time of 0.5 minutes and the extruded strands were passed directly into water. The resulting substantially uniform blend was non-miscible as evidenced by examination of cold-cut samples, stained with ruthenium tetroxide, under an electron microscope. The polyolefin was present as a discrete phase having a phase size of about 11 microns.

ILLUSTRATIVE EMBODIMENT III

The relative melt stability of the blend of Illustrative Embodiment II was determined by measuring the heat stability of the blend as well as the polyketone polymer from which it was produced. The melt stability was determined from the first and second crystallization temperatures as measured in a Perkin-Elmer DSC differential scanning calorimeter (DSC) which employed samples of the blend and the polyketone in sealed pan containers. The pan and contents are heated at a controlled rate, typically 20° C./minute, until the sample has melted. The pan and contents are then cooled until the sample has solidified and then heated, past a second melting point, to 285° C. where the sample is maintained for 10 minutes. The pan and contents are then cooled until the sample has solidified a second time. The crystallization or solidification temperature is defined as the temperature at which the heat flow reaches a minimum. The relative melt stability of the blend is the ratio of the second crystallization temperature of the blend to the second crystallization temperature of the polyketone from which it was formed. The relative melt stability of the blend of Illustrative Embodiment II to the base polymer of Illustrative Embodiment I was about 1.0. However, the blended polymer exhibited better processability by allowing almost double the feed rate of the base polymer.

What is claimed is:

1. A composition comprising a non-miscible blend of, as a major component, a linear alternating polymer of carbon monoxide and at least one ethylenically unsaturated hydrocarbon and, as a minor component, a poly($\alpha$-olefin).

2. The composition of claim 1 wherein the linear alternating polymer is represented by the formula

wherein B is the moiety of an ethylenically unsaturated hydrocarbon of at least 3 carbon atoms polymerized through the ethylenic unsaturation and the ratio of y:x is no more than about 0.5.

3. The composition of claim 2 wherein the poly($\alpha$-olefin) is polypropylene, poly(1-butene) or poly(4-methyl-1-pentene).

4. The composition of claim 3 wherein y=0.

5. The composition of claim 2 wherein B is a moiety of propylene and the ratio of y:x is from about 0.01 to about 0.1.

6. The composition of claim 5 wherein the poly($\alpha$-olefin) is isotactic.

7. The composition of claim 6 wherein the isotactic poly($\alpha$-olefin) is isotactic polypropylene.

8. The composition of claim 6 wherein the isotactic poly($\alpha$-olefin) is isotactic poly(4-methyl-1-pentene).

* * * * *